United States Patent [19]

Wein

[11] Patent Number: 4,495,206

[45] Date of Patent: Jan. 22, 1985

[54] HIGH PROTEIN, SOLID DIETARY FOOD PRODUCT

[75] Inventor: Edward Wein, Willowdale, Canada

[73] Assignee: Canada Packers, Inc., Canada

[21] Appl. No.: 136,408

[22] Filed: Apr. 1, 1980

Related U.S. Application Data

[63] Continuation-in-part of Ser. No. 898,994, Apr. 21, 1978, abandoned.

[51] Int. Cl.$^3$ .............................. A23L 1/04; A23J 3/00
[52] U.S. Cl. .................................... 426/250; 426/532; 426/656; 426/657
[58] Field of Search ................ 426/32, 657, 250, 532; 435/68, 69, 70; 260/117, 118

[56] References Cited

U.S. PATENT DOCUMENTS

| | | | |
|---|---|---|---|
| 2,338,415 | 1/1944 | Downey et al. | 426/32 |
| 2,431,256 | 11/1947 | Keil et al. | 435/69 X |
| 2,489,880 | 11/1949 | Hand et al. | 426/32 X |
| 3,738,913 | 6/1973 | Johnsen et al. | 435/69 |
| 3,974,294 | 8/1976 | Schwille et al. | 426/32 |
| 3,984,391 | 10/1976 | Nitschmann et al. | 260/117 |
| 4,042,688 | 8/1977 | Gans et al. | 424/177 |

OTHER PUBLICATIONS

Fruton, J. S. et al., "General Biochemistry", John Wiley & Sons, Inc., N.Y., 1953, p. 128.

Primary Examiner—Robert Yoncoskie
Attorney, Agent, or Firm—Bacon & Thomas

[57] ABSTRACT

A solid, high protein dietary food product containing high molecular weight polypeptides, and its method of preparation are disclosed. The food product has as its primary ingredient a gelatin hydrolysate composed predominantly of high molecular weight polypeptides. Essential amino acids and other additives may be included in the product.

6 Claims, No Drawings

HIGH PROTEIN, SOLID DIETARY FOOD PRODUCT

CROSS REFERENCE TO RELATED APPLICATION

This application is a continuation-in-part of application Ser. No. 898,994, filed Apr. 21, 1978, now abandoned.

BACKGROUND OF THE INVENTION

1. Field of the Invention

The present invention is directed to a new, high protein, solid, dietary food product formed from a gelatin hydrolysate and its method of preparation.

2. Description of the Prior Art

In the past few years a new type of diet plan termed a "protein sparing fast" has become extremely popular. It involves putting a patient on a complete fast except for high concentrations of proteins, minerals and vitamins, for periods averaging three weeks. Under this plan, the patient is able to maintain vital protein stores while losing excess fat. Of course, the protein ingested by the patient must be free of fat and carbohydrates. Such plans have also been adapted for use for institutionalized patients who require low residue diets, have digestive problems or are anorexic.

Heretofore, the most common source of the protein for use in such diet plans has been a predigested (for easier absorption) liquid protein formulation. For example, U.S. Pat. Nos. 4,025,650, 4,042,688 and 4,042,687 to Gans et al describe a high protein liquid formulation consisting of small peptides, i.e., mono-, di and tripeptides, prepared by enzymatic hydrolysis of animal collagen and fortified with tryptophan. Various other digestible additives such as flavoring agents, sweetners, texturizers, etc. may be added to the liquid hydrolysate to preserve and enhance the palatability of the formulation.

A serious shortcoming of the formulations typified by the Gans et al patents derives from the fact that they are prepared as liquids. However, it is often advantageous to prepare solid formulations. Thus, to have the formulation in solid form requires incorporating the high protein liquid hydrolysate in an edible solid carrier such as dicalcium phosphate or mannitol. This requirement of a carrier presents several problems. Firstly, it complicates the processing of the product by adding an extra step to the manufacturing procedure. Even more significantly, it introduces material of little nutritional value into the solid product, thereby decreasing the overall protein content of the formulation and reducing its effectiveness as a "high protein" diet aid. The use of carriers also presents problems in institutionalized use where there exists the potential adverse patient reaction to the carrier.

Another equally serious shortcoming of the liquid formulations is their extremely foul taste which is very difficult to mask. This problem is particularly prevalent when the product is used as a protein supplement for institutionalized patients who are anorexic.

It is, therefore, evident that there exists a need for a high protein, dietary formulation which is solid at room temperature so as to avoid the problems associated with the use of carriers for high protein liquids and to provide a formulation which is more pleasant tasting than those heretofore known in the art.

SUMMARY OF THE INVENTION

Accordingly, it is a primary object of the present invention to provide a high protein, dietary food product in solid form without the need for dilutive carriers.

Another object of the invention is to provide a gelatin hydrolysate possessing physical and chemical properties which render it suited for use as the primary ingredient in a high protein, solid dietary food product.

Still another object of the present invention is to provide a method for preparing a solid, highly concentrated protein formulation which can be directly ingested by the patient or incorporated into other solid food products.

Other objects and advantages of the present invention will be evident to those of skill in the art after studying the detailed description which follows.

The foregoing objects and advantages of the present invention are accomplished by providing a solid, dietary food product having a high predigested protein concentration which has as its essential ingredients a gelatin hydrolysate, composed predominantly of high molecular weight polypeptides, supplemented with essential amino acids. Generally, the gelatin hydrolysate is present in the product in amounts equal to or greater than 50% by weight and preferably greater than 55% by weight based on the total weight of the product. The amino acids added as supplement nutrients to the formulation are generally present in quantities known to those of skill in the art, being dependent upon the nutritional quality of the product desired. Exemplary of these amino acids are L-tryptophan, L-methionine, L-isoleucine or L-cysteine. Alternately, other protein hydrolysates, for example, soy hydrolysate, may be added to enhance the nutritional quality of the gelatin hydrolysate.

Other digestible additives are preferably incorporated into the formulation of the present invention including well-known food preservatives, such as potassium sorbate, sodium benzoate, methyl paraben and propyl paraben and various flavoring and coloring agents known to the food industry. To enhance the palatability of the product it is also desirable to include artificial sweetners, notably sodium saccharin, and texturizers, such as sorbitol or glycerine, which eases ingestion of the product. The amounts of the additives are not critical and can be adjusted so as to achieve maximum effectiveness with only routine experimentation.

DETAILED DESCRIPTION OF THE INVENTION

The gelatin hydrolysate used as the primary ingredient in the food product of the present invention is prepared by controlled hydrolysis of gelatin solutions formed from animal collagen. Hydrolysis of the gelatin solution may be accomplished by either enzyme, acid or alkali hydrolysis, as more fully set forth in the examples which follow this description of the invention. Enzyme hydrolysis using a microbial protease produced by the microorganism bacillus subtilis and marketed by Miles Laboratories under the tradename HT 200 has been found to be particularly effective and is preferred. The hydrolysis reaction is carefully controlled by selection of the hydrolyzing agent, the temperature and pH of the reaction medium, the concentration of the reactants, and the time of reaction, so as to obtain a hydrolysate which is solid at room temperature at a concentration of protein (solids) generally greater than 50% by weight. This is accomplished by controlling the reaction to obtain a percent hydrolysis of the gelatin which is less than 50% as measured by formol titration. The hydrolysate does not exhibit the rubberiness as gelatin having the same concentration of protein. Analysis of the gelatin hydrolysate formed in this manner reveals that it is composed predominantly of high molecular weight polypeptides. Typically, the percentage of polypeptides in the gelatin hydrolysate having molecular weights greater than 2,000 is above 90% and preferably greater than 95%, when measured by membrane separation using a UM2 membrane manufactured by Amicon Corporation.

The gelatin hydrolysate of the invention is further characterized in that the viscosity of a 10% solids (w/w) solution at 140° F. is between about 13–25 millipoises, and preferably between about 17.5–25 millipoises and in that it exhibits a gel strength at a concentration of 10% (w/w) solids at 10° C. between about 5–74 gm and preferably between about 24–74 gm. Hydrolysates having these characteristics exist as solid gels at 57% solids, even when heated above room temperature. Hydrolysates having viscosity and gel strength characteristics below these limits will not exist as solids unless concentrated substantially to dryness. Hydrolysates having characteristics which exceed the maximum limits above-specified may still be suited for use as solid, high protein food supplements, but due to increased difficulty in handling and processing, they are generally not practical.

In preparing the high protein, solid dietary food product of the invention, the gelatin hydrolysate is concentrated and L-tryptophan and the other previously described additives are incorporated into the concentrated hydrolysate. It is also possible to add the additives to the hydrolysate prior to the final concentrating step. The resulting solid mixture may then be cast in molds to form products having the consistency of ju-jube candy. Alternately, the product may be cast in molds and dried to give a hard candy type product. The pH of the product should be adjusted prior to casting to enhance flavor and inhibit microbiological growth. This pH adjustment is accomplished by adding sufficient quantities of an edible organic acid, such as citric acid, to maintain the pH of the product at or below 4.5.

The solid, high protein food product prepared in accordance with the present invention thus provides a highly effective substitute for the high protein liquid formulations heretofore employed. More importantly, the solid product of the present invention provides several advantages not exhibited by the liquid. For example, it has been observed that the solid dietary candy formulation which is less hydrolyzed than the liquid formulation is much less acrid or bitter in taste and therefore greatly more palatable. Accordingly, it is far easier to mask its almost bland flavor with small quantities of flavoring agents. This enhancement of palatability is extremely important for therapeutic applications in which the patient is anorexic, which commonly occurs in cancer therapy.

Another significant advantage of the solid formulation of the present invention is its ability to supply extremely high concentrations of the protein hydrolysate. Solid products prepared from the liquid hydrolysate formulation necessarily require a carrier which dilutes the protein concentration of the resulting solid product. The requirement of a carrier also necessitates additional process steps, resulting in a more complex and expensive manufacturing procedure.

The product of the invention is particularly useful for therapeutic applications where a highly pure, palatable, protein dietary supplement is required. Since the product does not require the inclusion of non-nutritive additives, the potential for adverse patient reaction is minimized.

To further illustrate the various objects and advantages of the present invention, the following examples are provided, it being understood that their purpose is entirely illustrative and in no way intended to limit the scope of the invention.

EXAMPLE 1

Preparation via Enzymatic Hydrolysis

Gelatin was concentrated to 15% solids, adjusted to pH 5.0 and hydrolyzed with 0.03% of microbial protease (Miles Laboratories—HT 200) for 3½ hours at 50° C. At the end of this time, the solution was boiled for 5 minutes and adjusted to pH 4.2 with citric acid. Tryptophan was added at this stage. Filtration was carried out followed by concentration in a wiped film evaporator to 57% solids. Potassium sorbate and sodium benzoate were added to 0.1% and the material was pasteurized and packaged hot into drums for shipment to a candy manufacturer. The candy manufacturer may then remelt the prouct, add flavor, color, texturizers (sorbitol), sweetner and cast the product into molds to form bar size candies of ju-jube consistency. Alternately, the formulation once cast into the molds may be air dried to form a hard candy type of product.

EXAMPLE 2

Preparation via Acid Hydrolysis

A 30% gelatin solution was made up from gelatin powder by soaking in cold water and then heating to dissolve. The pH was adjusted to 5.0 and the solution was boiled for 8 hours to hydrolyze the product and bring the solids concentration to 57% at the same time. The pH was adjusted to 4.2 at the end of the hydrolysis and the product subsequently handled for candy manufacture as in Example 1.

EXAMPLE 3

Comparison of Liquid Hydrolysate to Solid Hydrolysate Formulation

Table I illustrates the various, typical important differences between the solid, high protein candy formulation and the liquid hydrolysate formulation described in the prior art.

TABLE I

| Property | Gelatin | Liquid Hydrolysate | Gelatin Hyrolysate of Example 1 |
|---|---|---|---|
| Viscosity (10% and 140° F.) | 63.5 mp | 9.0 mp | 24.0 mp |
| % Hydrolysis (Formol Titration) | 24.4 | 53.1 | 34.2 |
| Gel Strength (10% and 10° C.) | >400 g | no solidification | 28 g |
| Form at Room Temp. and 55% Solids | solid | liquid | solid |
| % Protein with M.W. Less than 2000 | 0.00% | 31% | 1.9% |

Measurement Techniques (i) Viscosity: Viscosity was measured by first adjusting the concentrations of the samples to 10% w/w, heating to 140° F. and measuring the time required to pass a given volume past a fixed orifice at 140° F. This time was converted to millipoise using a previously obtained calibration graph. The values of viscosity obtained are related to the molecular weight with the higher viscosity indicating a higher average molecular weight.

(ii) Percent Hydrolysis: This was determined by titrating the exposed carboxyl groups of the hydrolysate with NaOH after having first blocked the amino groups with formaldehyde. By referring the titration value to a completely hydrolyzed protein (6N HCl over 24 hours) the relative percent hydrolysis is obtained. The greater the percent hydrolysis, the smaller will be the average molecular weight.

(iii) Gel Strength: This was performed on a standard instrument called a Bloom gelometer. A 100 ml of 10% w/w solution of the sample was incubated at 10° C. for 17 hours in a standard size beaker and the force required, in grams, to penetrate 4 mm into the gel with a standard plunger was measured. If the material did not solidify, the force required or the reading was zero. Values above zero indicate the strength of the gel.

(iv) Form at Room Temperature: These values were obtained from direct observation.

(v) Molecular Weight: This was measured using a polymeric membrane identified as UM2 by the manufacturer Amicon Corporation and selective to molecules having molecular weights below 2000.

It is evident from this data that the gelatin hydrolysate of the present invention exhibits significant differences when compared to the liquid hydrolysate formulation. The importance of these differences has been previously discussed.

EXAMPLE 4

Effect of Enzyme Level on Gelatin Hydrolysate Characteristics

To demonstrate the effect of enzyme level on the characteristics of the gelatin hydrolysate and to compare the physical properties of hydrolysates prepared over a range of enzyme levels, the following experiment was conducted.

Gelatin was concentrated to 15% solids, adjusted to pH 5.0 and hydrolyzed with a specified amount of microbial protease (Miles Laboratories—HT 200) for 3½ hours at 50° C. At the end of this time, the solution was boiled for 5 minutes and adjusted to pH 4.2 with citric acid. The amount of enzyme was varied from 0.025% (w/w) to 0.2% (w/w). The resulting hydrolysates were tested for gel strength, viscosity and physical condition using the measurement procedures described in Example 3. The results are tabulated in Table II:

TABLE II

| % Enzyme Level Used (Miles HT 200) | Gel Strength at 10% Solids (g) | Viscosity at 140° F. & 10% (mp) | Physical Characteristics at Room Temp. and 57% solids | Physical Characteristics at 80° F. and 57% solids |
| --- | --- | --- | --- | --- |
| 0.025 | 74 | 25 | Solid gel | Solid gel |
| 0.045 | 36 | 20.5 | Solid gel | Solid gel |
| 0.065 | 24 | 17.5 | Solid gel | Solid gel |
| 0.15 | 0–5 | 13.0 | Soft Solid gel | Soft Solid gel |
| 0.2 | 0 | 11.0 | Liquid | Liquid |

From this table it is apparent that by varying the concentration of enzyme, the characteristics of the hydrolysate can be varied as desired.

While the invention has now been described in terms of certain preferred embodiments, and exemplified with respect thereto, the skilled artisan will readily appreciate that various modifications, changes, omissions and substitutions may be made without departing from the spirit thereof. It is intended, therefore, that the present invention be limited solely by the scope of the following claims.

What is claimed is:

1. A solid, high protein dietary food product consisting essentially of a gelatin hydrolysate, and one or more members selected from the group consisting of essential amino acids, preservatives, flavoring agents, coloring agents, texturizers and sweetners, wherein said gelatin hydrolysate is composed predominantly of high molecular weight polypeptides such that it is solid at room temperature over the range of concentrations of protein solids in aqueous solution from 50 to 100%, by weight, and such that the viscosity of a 10% solids (w/w) aqueous solution at 140° F. is between about 13–25 millipoises and wherein said gelatin hydrolysate is present in quantities equal to or greater than 50% by weight of the product.

2. The product as defined in claim 1, wherein said essential amino acids are selected from the group consisting of L-tryptophan, L-methionine, L-isoleucine, and L-cysteine.

3. A method for preparing a solid, high protein dietary food product comprising:
    (a) hydrolyzing gelatin derived from animal collagen so as to produce a gelatin hydrolysate which is composed predominantly of high molecular weight polypeptides which is solid at room temperature over the range of concentrations of protein solids in aqueous solution from 50 to 100%, by weight, and such that the viscosity of a 10% solids (w/w) aqueous solution at 140° F. is between about 13–25 millipoises;
    (b) adding one or more members selected from the group consisting of essential amino acids, preservatives, flavoring agents, coloring agents, texturizers and sweetners, to said gelatin hydrolysate in an amount such that the quantity of said gelatin hydrolysate is equal to or greater than 50% by weight and,
    (c) molding said mixture to give a solid, dietary food product.

4. The method as defined by claim 3, wherein said hydrolyzing is accomplished by enzymatic hydrolysis.

5. The method as defined by claim 3, wherein said hydrolyzing is accomplished by acid hydrolysis.

6. The method as defined by claim 3, wherein said hydrolyzing is accomplished by alkali hydrolysis.

* * * * *